US011555768B2

(12) United States Patent
Balvanz et al.

(10) Patent No.: US 11,555,768 B2
(45) Date of Patent: Jan. 17, 2023

(54) GROUND ENGAGEMENT ACCELERATED WEAR TESTING DEVICE AND METHOD

(71) Applicants: Loran R. Balvanz, Eldora, IA (US); Vaughn L. Bauer, Paton, IA (US)

(72) Inventors: Loran R. Balvanz, Eldora, IA (US); Vaughn L. Bauer, Paton, IA (US)

(73) Assignee: Balvanz Land, L.L.C., Eldora, IA (US)

( * ) Notice: Subject to any disclaimer, the term of this patent is extended or adjusted under 35 U.S.C. 154(b) by 0 days.

(21) Appl. No.: 15/193,022

(22) Filed: Jun. 25, 2016

(65) Prior Publication Data

US 2016/0377520 A1  Dec. 29, 2016

Related U.S. Application Data

(60) Provisional application No. 62/185,228, filed on Jun. 26, 2015.

(51) Int. Cl.
*G01N 3/56* (2006.01)
(52) U.S. Cl.
CPC ...................................... *G01N 3/56* (2013.01)
(58) Field of Classification Search
CPC ............. G01N 3/40; G01N 3/56; G01N 3/565
See application file for complete search history.

(56) References Cited

U.S. PATENT DOCUMENTS

| 2,041,287 | A | 5/1936 | Frisch | |
|---|---|---|---|---|
| 4,442,707 | A | 4/1984 | Tuzson | |
| 4,483,197 | A | 11/1984 | Kellner | |
| 5,795,990 | A * | 8/1998 | Gitis | ........................ G01N 3/56 73/10 |
| 7,313,976 | B2 | 1/2008 | Swain | |
| 8,833,136 | B2 | 9/2014 | Chang et al. | |
| 2011/0303018 | A1 * | 12/2011 | de Bondt | ................. G01N 3/56 73/760 |
| 2013/0008649 | A1 | 1/2013 | Vestbostad | |
| 2013/0055797 | A1 * | 3/2013 | Cline | ..................... G01N 3/303 73/82 |
| 2013/0143191 | A1 | 6/2013 | Zemenchik et al. | |

(Continued)

FOREIGN PATENT DOCUMENTS

| CN | 102128758 A | 7/2011 |
|---|---|---|
| CN | 202471412 U | * 10/2012 |
| CN | 203025041 U | 6/2013 |

(Continued)

OTHER PUBLICATIONS

English Translation of CN203025041U Jun. 26, 2013.*

(Continued)

*Primary Examiner* — Alexander A Mercado
(74) *Attorney, Agent, or Firm* — Daniel A. Rosenberg; Taft Stettinius & Hollister LLP

(57) ABSTRACT

The present invention is a device to provide a lab consistent accelerated wear test on an agriculture or industrial ground working tool. The circular media bin is filled to a proper level with an abrasive media. The sample tool is moved in a circular path though the abrasive media. A library of consistent accelerated wear test data is accumulated with the device. This library is correlated with industrial ground working tool usage in field conditions. This provides a math model that predicts tool wear and facilitates virtual tool design optimization.

11 Claims, 8 Drawing Sheets

(56) References Cited

U.S. PATENT DOCUMENTS

2013/0327120 A1* 12/2013 Chang .................. G01N 3/56
73/7

FOREIGN PATENT DOCUMENTS

CN            204086058 U     1/2015
UA               26308 U  *  9/2007

OTHER PUBLICATIONS

English Translation of CN204086058U Jan. 7, 2015.*
English Translation of CN 202471412, 2012.*
English Translation of UA 26308, 2007.*

* cited by examiner

GROUND ENGAGEMENT ACCELERATED WEAR TESTING DEVICE AND METHOD

CROSS-REFERENCE TO RELATED APPLICATIONS

This application claims priority to U.S. Provisional Patent Application Ser. No. 62/185,228 filed Jun. 26, 2015, titled "Ground Engagement Accelerated Wear Testing Device", the entire contents of which is incorporated herein, both bodily and by reference.

FEDERALLY SPONSORED RESEARCH

Not Applicable

SEQUENCE LISTING OR PROGRAM

Not Applicable

FIELD OF THE INVENTION

The present invention relates to ground working tools, such as agriculture or industrial equipment, and more specifically, to a simulator for accelerated ground wear testing of these tools.

BACKGROUND OF THE INVENTION

Agriculture and industrial ground working tools include sweeps, rippers, harrows, disks, drills, injectors and planters. These tools are attached to an implement and pulled behind a motorized tractor.

Agriculture crop yield is directly related to soil compaction. Ground working tools are being used at greater depths to reduce sub-surface compaction. Use of a ground working tool at a greater depth can substantially impact tool life.

The life of these tools is limited by abrasive wear caused by contact with the soil and objects within the soil such as rocks. Tool design to improve abrasive wear includes steel alloy materials, heat treatment, thickness, shape and coatings. An example coating is outlined in US2013/0252023, Caden Edge Welding Process, published on Sep. 26, 2013.

To provide an increase in the speed and accuracy of tool development, it is desirable to have an accelerated wear testing device that provides consistent results. Field testing of a tool takes too much time, is inconsistent due to soil variations, can be interrupted due to weather conditions, and requires substantial acreage of untilled ground.

SUMMARY OF THE INVENTION

The present invention is a device to provide a lab consistent accelerated wear test on a ground working tool.

The circular media bin is filled to a proper level with an abrasive media. The abrasive media is formulated to provide consistent and aggressive wear on the sample tool. The sample tool is moved in a circular path though the abrasive media. Due to the circular path of the tool travel, slight uneven wear may occur. To correct this, the tool travel is periodically reversed. This reversal involves remounting of the tool and any media reconditioning devices on the draw bar arm.

The abrasive media could be composed of stainless steel balls. The diameter of the stainless steel balls is 0.25 inch to 1.5 inch. The material used is SAE 304 stainless steel or a similar grade.

The abrasive media could be a mixture of sand, stainless steel balls and water. The composition may be adjusted to match the conditions of a particular field soil. The sand and water provide the bulk of the media. With the correct moisture content, sand provides a media that compacts well. Sand also provides good fine abrasion. The stainless steel balls provide impact abrasion.

Important parameters to maintain during the accelerated wear test include:
 a. speed of tool travel
 b. tool depth relative to soil surface
 c. tool orientation (roll, yaw, and pitch angles)
 d. media condition The sub-parameters of media condition to maintain include:
 a. % ratio of materials
 b. material composition
 c. material size
 d. moisture
 e. temperature
 f. level surface
 g. compaction
 h. media uniformity Important parameters to monitor include:
 a. draw bar forces (pull, torque, impact variations)
 b. tool wear rate (multiple locations)
 c. tool temperature (multiple locations)

Speed of tool travel is controlled by the drive motor and gear box. This will determine the RPM of the draw bar arm. The distance of the shank from the rotation center must also be held constant.

Tool depth is controlled by the amount of abrasive media in the media bin and the mounting of the tool/shank on the draw bar arm. An adjustable tool depth method is outlined in the disclosure.

Tool orientation is controlled by the mounting of the tool/shank on the draw bar arm. Roll, yaw and pitch terms are similar to aviation.

Material size is monitored periodically. If material size of out of parameters, the abrasive media in the bin must be replaced.

Moisture in the abrasive media could be maintained in the range of 4-10%. A probe in the media bin is used to measure for % moisture by weight. The system automatically adds water to the media in the bin as needed. An important parameter to allow proper compaction is soil moisture.

Figure 1:
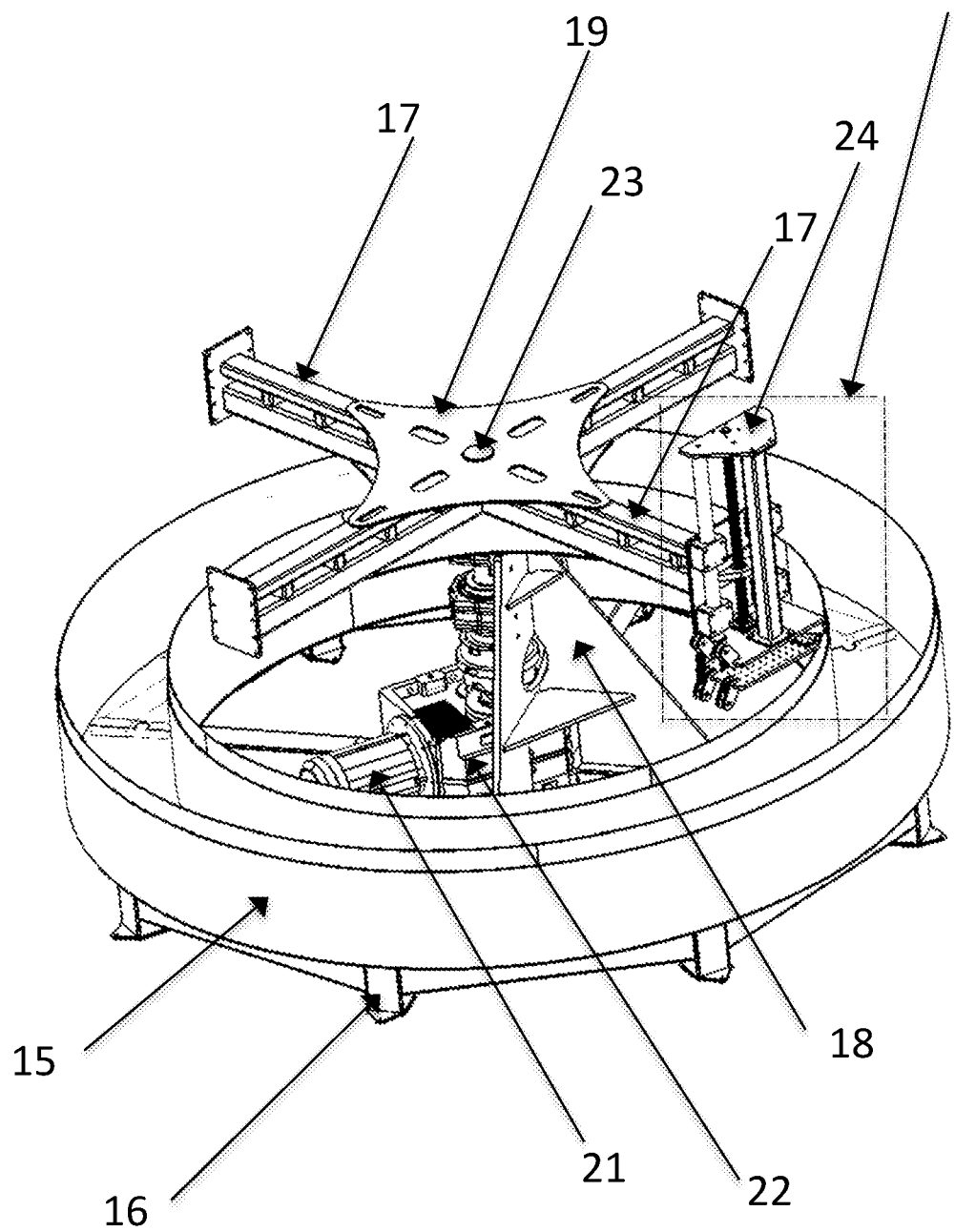
FIG. 1 is an isometric side view of the wear testing device.

| REFERENCE NUMERALS | |
|---|---|
| 15 media bin | 16 base |
| 17 test arm | 18 center support |
| 19 arm support | 20 floor |
| 21 motor | 22 gear box |
| 23 shaft | 24 adjustable mount |
| 25 drive screw | 27 slide shaft |
| 29 sliding bearing | 31 mounting plate |
| 33 screed arm | 35 screed support |
| 36 screed | 38 shank |
| 40 shank plate | 42 sweep |
| 44 sweep | 45 media level |
| 47 arm motion | 48 arm sensor |
| 50 flex coupling | 52 pillow block bearing |

DETAILED DESCRIPTION OF THE DRAWINGS

FIG. 1 is an isometric view of the wear testing device. The media bin 15 includes a flat bottom, a circular inner wall and a circular outer wall. The base 16 provides support for the media bin 15 and structure for the center support 18. All of these components would be welded steel construction. The base 16 would be affixed to a concrete floor.

The motor 21 is connected to the gear box 22 input. The gear box 22 is attached to the base 16. The gear box 22 has a large speed reduction to provide a high output torque at low RPM. The output of the gear box 22 is at a 90 degree angle to the input and connected to a flex coupling 50. The flex coupling is also connected to the shaft 23. The shaft 23 is connected to the test arms 17 and the arm support 19. An adjustable mount 24 is attached to the end of each test arm 17. Only one adjustable mount 24 is shown in FIG. 1.

Figure 2:
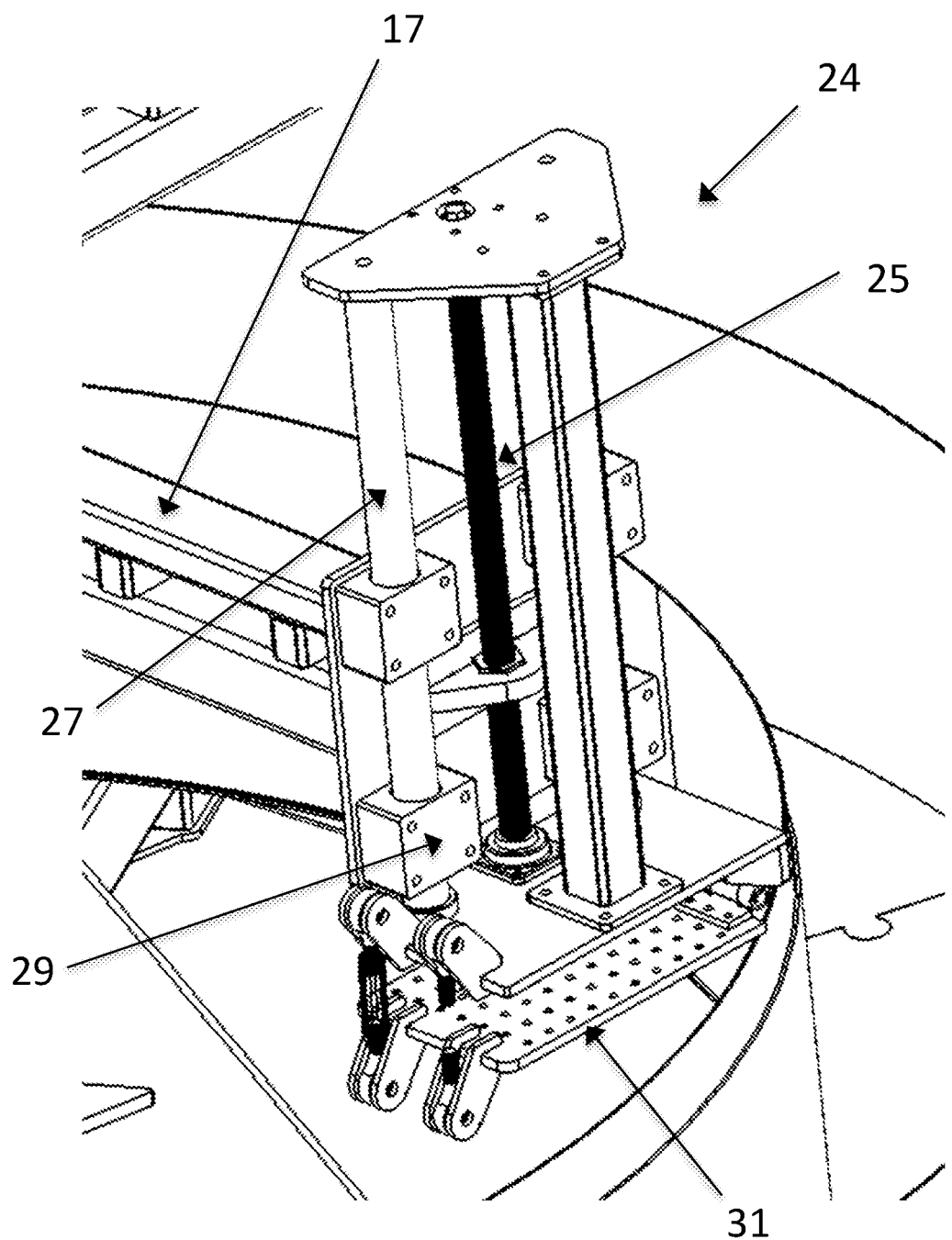
FIG. 2 is an enlarged view of the adjustable mount taken from FIG. 1.

FIG. 2 is an enlarged view of the adjustable mount 24 taken from FIG. 1. The adjustable mount 24 includes the following parts. Four sliding bearings 29 are attached to the end plate of the test arm 17. Two slide shafts 27 allow vertical movement of the adjustable mount 24. The drive screw 25 is motorized to control the movement. The mounting plate 31 has angular adjustment and includes holes for fastening the ground engagement tool under test.

Figure 3:
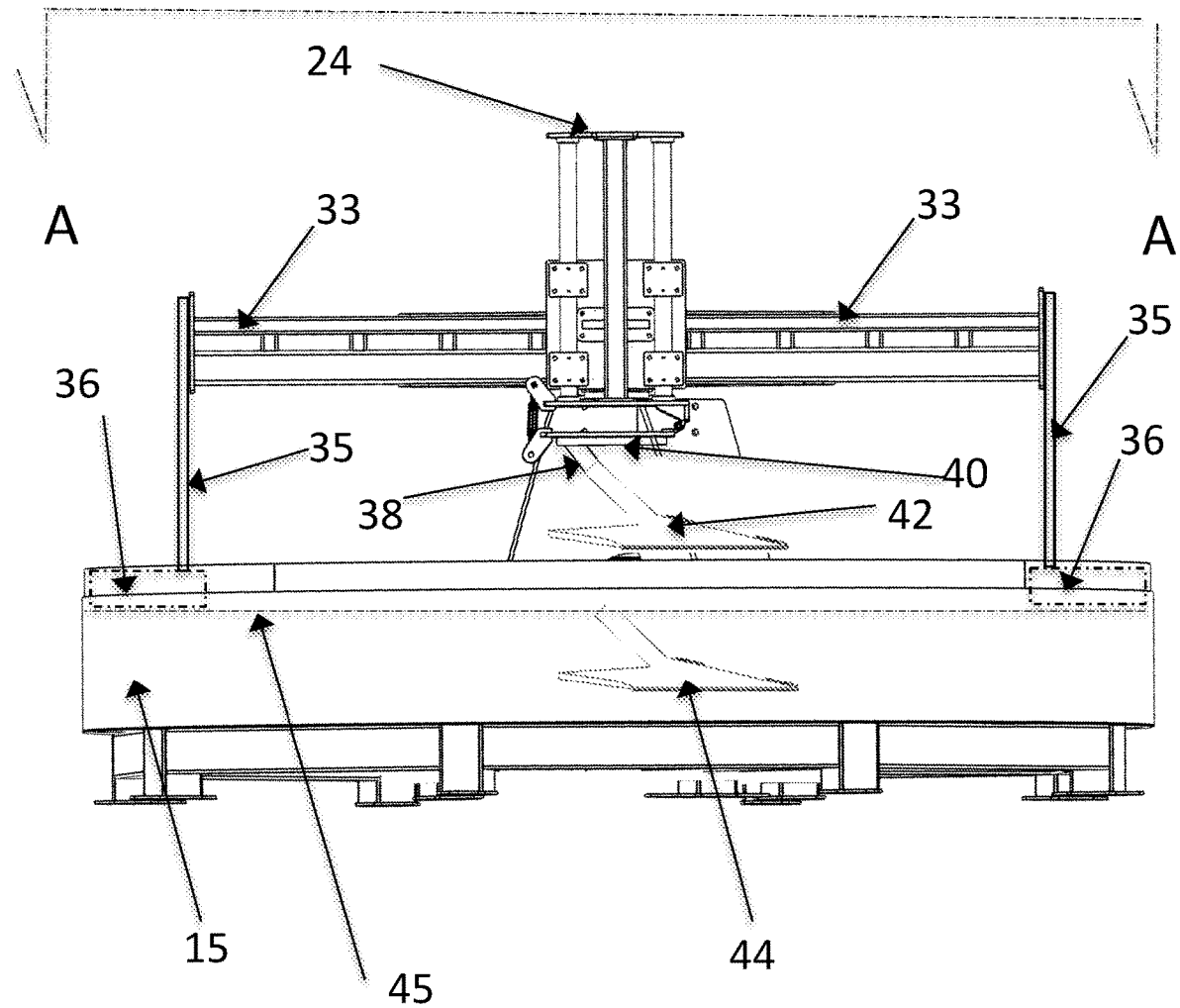
FIG. 3 is a side view of the wear testing device.

FIG. 3 is a side view of the wear testing device. A media level 45 line is shown in the media bin 15. The abrasive material or stainless steel balls would be filled to approximately this level. The two screed arms 33 are attached to the shaft 23 and arm support 19. The screeds 36 are positioned in height to match the media level 45. The screed support 35 is rigidly connected to the screed 36. The screed support 35 is adjustably connected with bolts to the screed arm 33 via multiple hole positions.

The purpose of the screed 36 is to smooth the abrasive media after each pass of the ground engagement tool under test.

The ground engagement tool under test is shown as a sweep 42. To connect the sweep 42 to the adjustable mount 24, a weldment is constructed. A shank 38 is welded to a shank plate 40. The shank plate 40 is bolted to the mounting plate 31. The sweep 42 is bolted to the shank 38.

The sweep 42 is shown in the raised position above the media level 45. This position is used to mount the sweep 42 or measure the amount of wear on the sweep 42. The drive screw 25 is used to position the adjustable mount 24 to the lowered position. The sweep 44 is shown in the lowered position. This is the position used while rotating the shaft 23 and performing the accelerated wear test.

Figure 4:
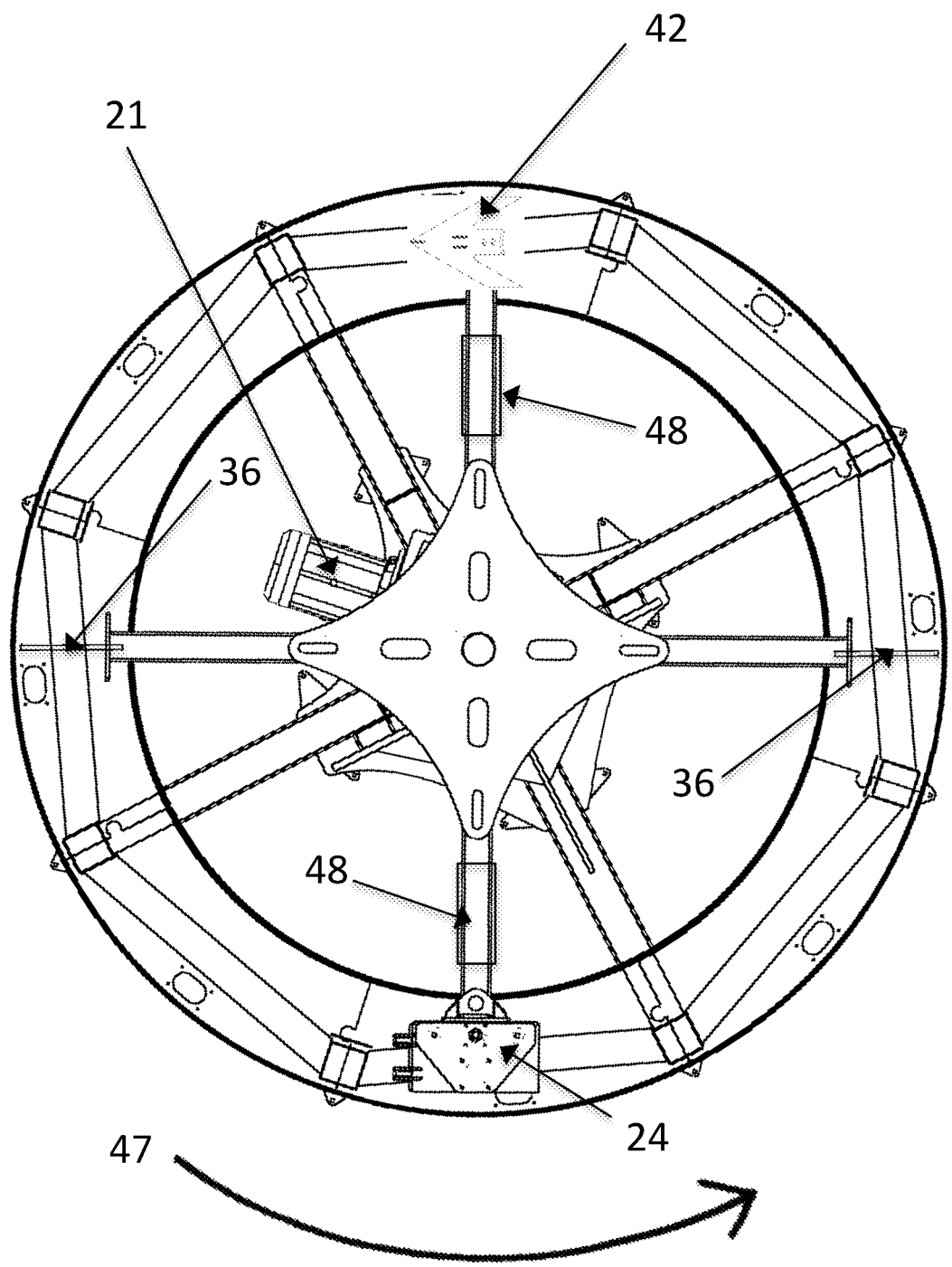
FIG. 4 is a top view of the wear testing device taken along lines A-A from FIG. 3.

FIG. 4 is a top view of the wear testing device taken along lines A-A from FIG. 3. The sweep 42 is shown centered in the media bin 15. The adjustable mount 24 is not shown above the sweep 42. In operation, the wear testing device would include two adjustable mounts 24 and two sweeps 42. The screeds 36 are shown centered in the media bin 15. The arm motion 47 direction is shown.

A load cell arm sensor 48 would be mounted mid-point along the length of the test arm 17. The arm sensor 48 could measure the strain of the test arm 17. Another approach would be to split the test arm 17 into two parts and bolt the arm sensor 48 into the space between. A commercially available load cell sensor could be used in this case.

As an example configuration, the mid-point of the media bin is 10 feet in diameter. If the desired velocity of the sweep 42 is 8 feet per second, the shaft 23 would rotate at 15.3 revolutions per minute.

$$((60 \text{ sec/minute}) \times (8 \text{ ft/sec}))/(3.14 \times 10 \text{ ft}) = 15.3 \text{ RPM}$$

A variable speed motor control could be used to achieve precise motor speed.

Figure 5:
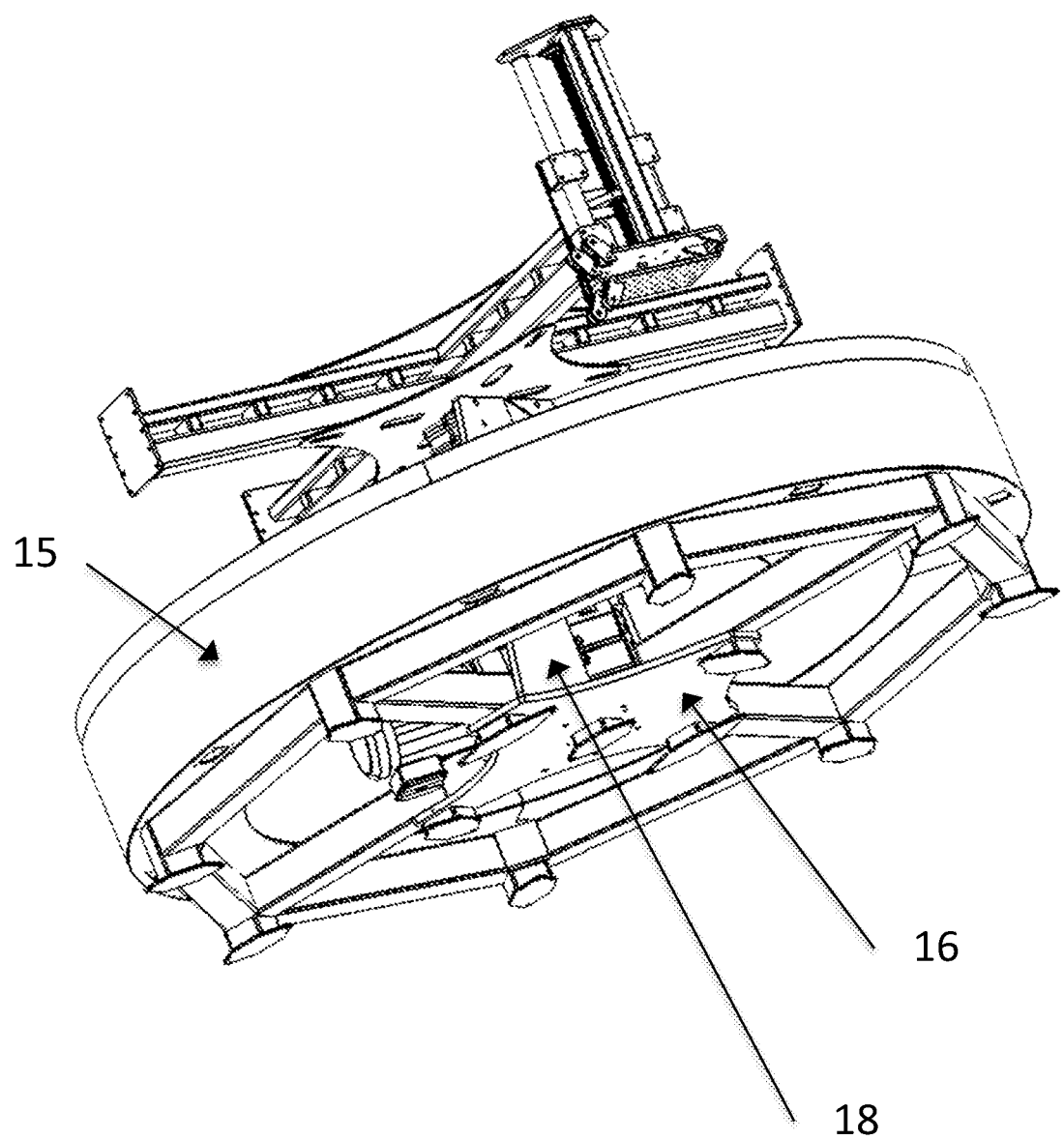
FIG. 5 is an isometric view of the bottom of the wear testing device.

FIG. 5 is an isometric view of the bottom of the wear testing device. The welded attachment of the center support 18 to the base 16 is shown.

Figure 6:
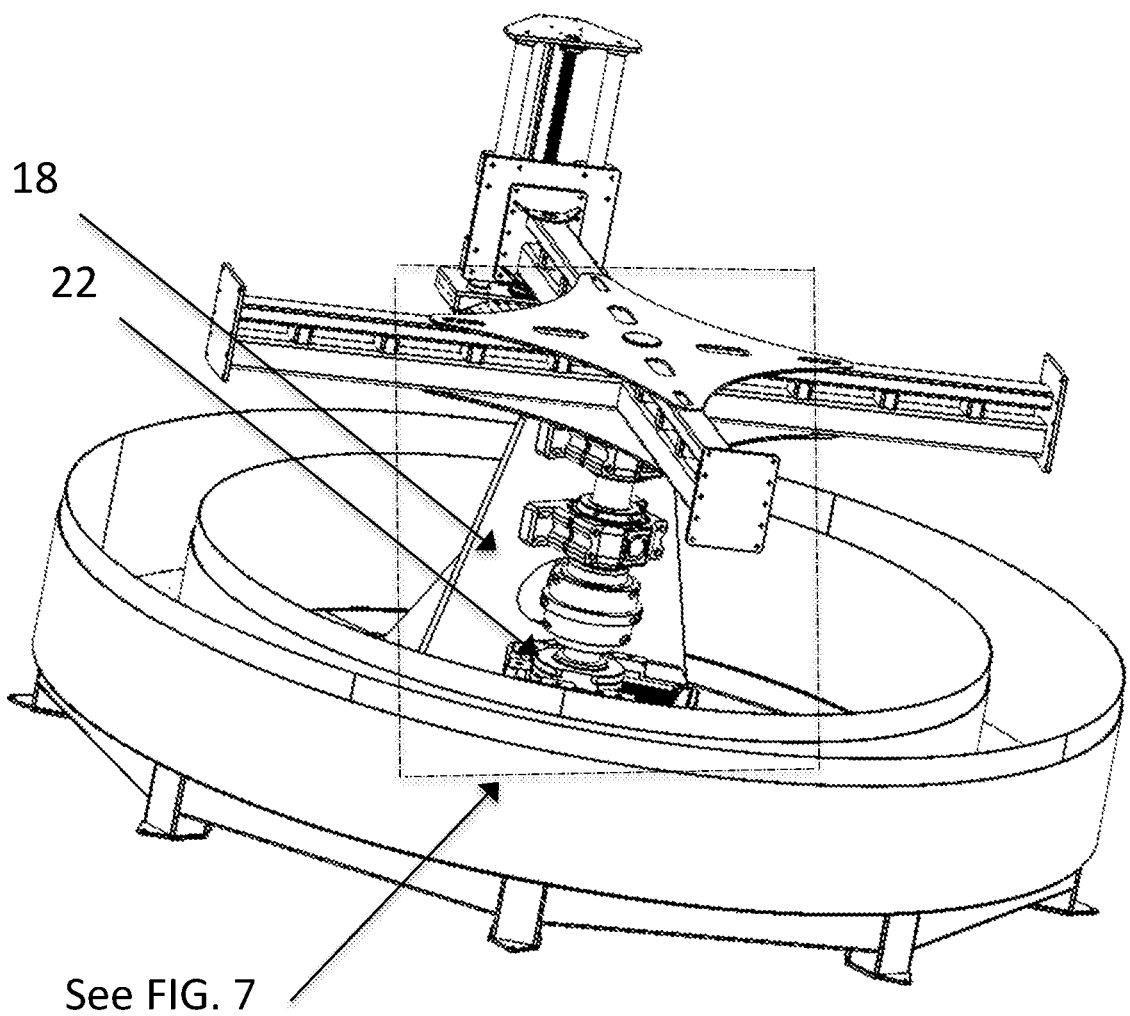
FIG. 6 is a isometric back view of the wear testing device.

FIG. 6 is a isometric back view of the wear testing device. The driveline components are visible in this view.

Figure 7:
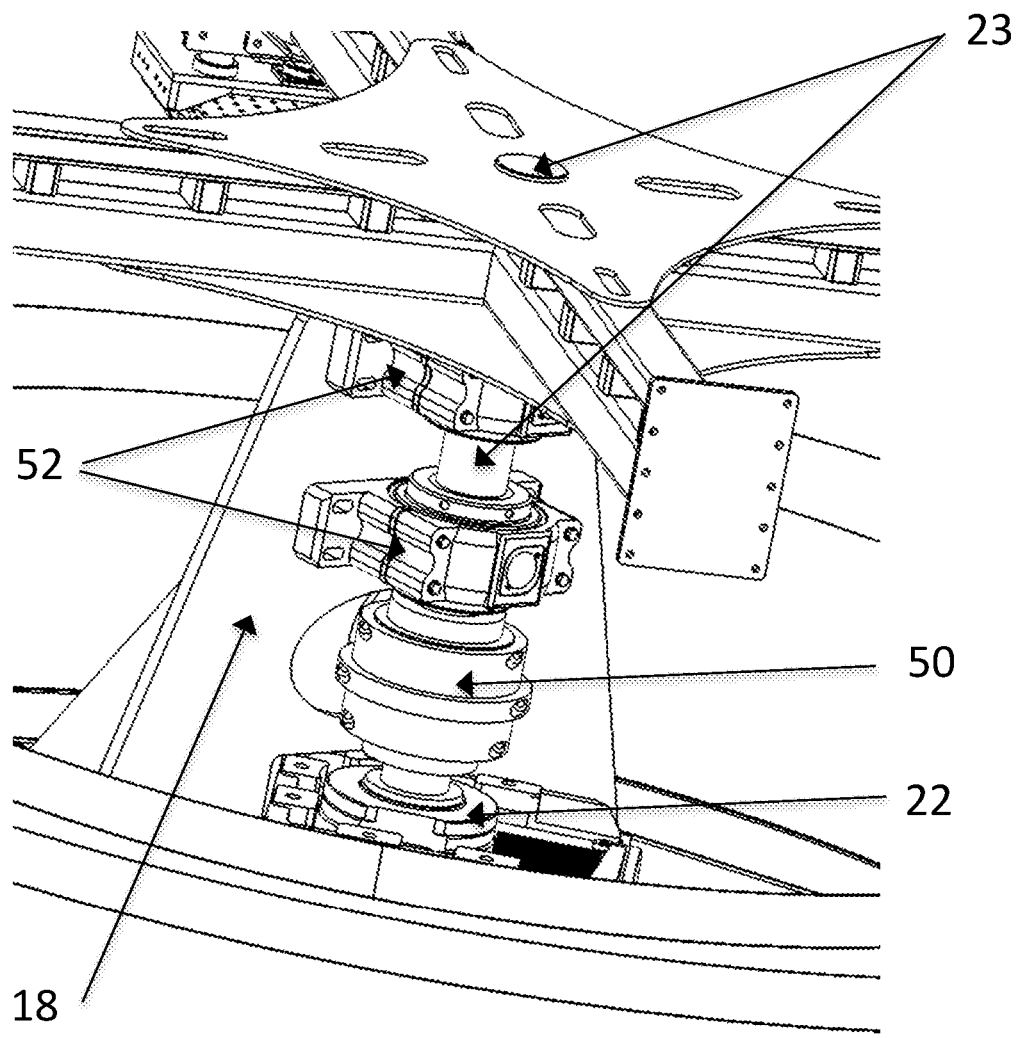
FIG. 7 is an enlarged view of the drive shaft taken from FIG. 6.

FIG. 7 is an enlarged view of the drive shaft taken from FIG. 6. The flex coupling 50 rotates and alleviates any misalignment between the output of the gear box 22 and the shaft 23. The shaft 23 is supported with two pillow block bearings 52 which are bolted to the center support 18.

Figure 8:
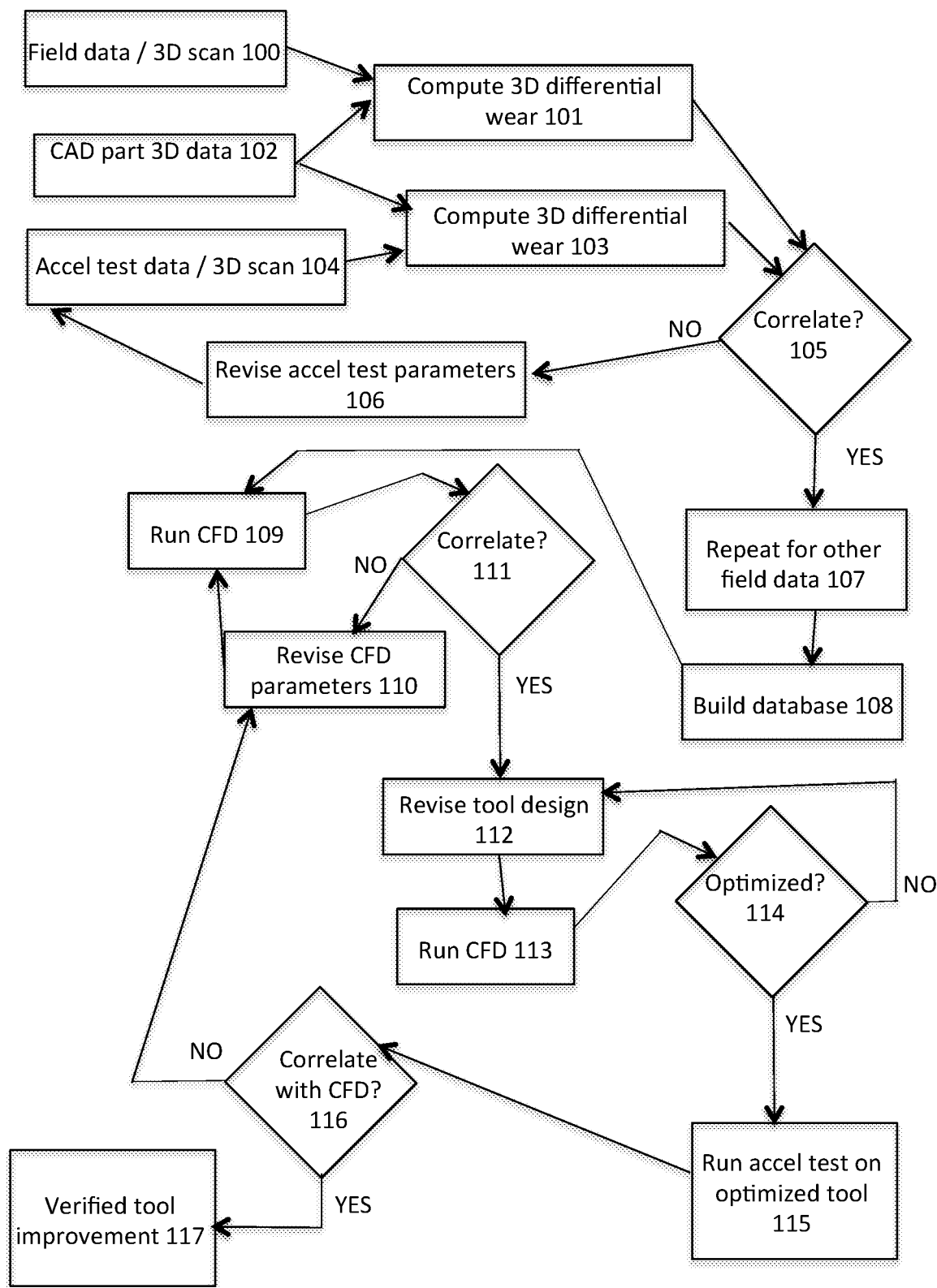
FIG. 8 is a flow chart of virtual tool design optimization.

FIG. 8 is a flow chart of virtual tool design optimization. The goal of virtual tool design optimization is to provide a math model that predicts tool wear.

The Field data/3D scan 100 is analyzing an existing tool that has been used under known soil conditions. An example would be a specific sweep part used to till 500 acres/day at a 10 inch depth for 200 days total on a specific soil type in a specific county in Kansas. The worn sweep would be put through a 3D scan.

The CAD part 3D data 102 is the information on an existing tool.

The Accelerated test data/3D scan 104 is analyzing an existing tool that has been accelerated wear tested. An example would be a specific sweep part tested for 400 hours at 5 feet per second at a 10 inch depth in a specific abrasive media.

The Compute 3D differential wear 101 and 103, compares the worn part to the CAD data. The output of this differential analysis would show the wear patterns over the part and the amount of part weight reduction.

The Correlate 105 compares the Field data differential 101 to the Accel test differential 103. If there are substantial differences, the flow chart proceeds to 106.

Revise accel. test parameters 106 adjusts to compensate for where the Correlate 105 showed differences. If the pattern matches, but is overall less wear on the Accel test 104, the Accel test hours could be increased. If the pattern shows less impact wear on the Accel test 104, the Accel test abrasive media could be revised to include larger stainless steel balls.

Repeat for other field data 107 would involve a different field location or different tool and steps 100 thru 106. All of the data would be organized into a database 108.

Run CFD 109 would involve using a computation a fluid dynamics program to simulate the test conditions of the field data 100. The output of the CFD 109 would be a differential wear that would be compared to the field wear 101. This would be checked for correlation 111 and the CFD parameters revised 110. Substantial CFD runs and adjustments would be needed to achieve an accurate correlation.

Revise tool design 112 would include making a change to the tool in an area estimated to improve wear. The revised design would be checked with the Run CFD 113 step. This would be an interitive loop until the design is Optimized 114.

Run accel test on optimized tool 115 would provide a physical test on the design. The results would then be checked—Correlate with CFD 116. The output of the flow chart is a Verified tool improvement 117.

Following are some examples of how the virtual tool design could be utilized:
 a. Comparison of ground engagement tools with Caden Edge coating vs. non Caden Edge coating.
 b. Comparison of ground engagement tools at various soil depths.
 c. Comparison of ground engagement tools at various speeds of tillage.
 d. Comparison of ground engagement tools for draw bar forces. The accel test data and correlating CFD provides tool forces. This would be extrapolated to provide tractor HP requirements.

With the virtual tool design in place, the same CFD would be used to model the soil movement. A similar style of flow chart would be used to correlate field data with the CFD model. 3D imaging of the tilled field soil and tilled abrasive media would be included in the data input. Following are some examples of how virtual soil movement could be utilized:
 a. Comparison of soil compaction with various tools, depths, and speeds.
 e. Comparison of soil compaction with Caden Edge coating vs. non Caden Edge coating.
 b. Comparison of furrow shape/height with various tools, depths, and speeds.
 c. Comparison of soil/ground cover mixing with various tools, depths, and speeds.

Optimization of the above soil variables would result in improved crop yields, weed control and tillage operator time.

Although the invention has been described in terms of specific embodiments and applications, persons skilled in the art can, in light of this teaching, generate additional embodiments without exceeding the scope or departing from the spirit of the claimed invention. Accordingly, it is to be understood that the drawings and description in this disclosure are provided to help the reader understand the invention, and do not limit the scope of the claims.

The invention claimed is:

1. A wear testing device, comprising:
 a round media bin having a circular inner and outer wall for containing a test medium therebetween;
 a centrally located motor, gear box, and drive shaft;
 a test arm operatively connected to the drive shaft extending radially outward from the drive shaft being driven rotationally thereby;
 an adjustable mount at the end of the test arm and above the media bin, having a motorized drive screw and a slide shaft connected thereto moving vertically up and down;
 a mounting plate connected to the adjustable mount having an angular tilt and a plurality of holes therein;
 a wear part affixed to at least one of the holes in the mounting plate and extending into the media in the media bin such that rotation of the test arm by the motor exposes the wear part to wear; and
 a screed arms operatively connected to the drive shaft extending radially outward from the drive shaft being driven rotationally thereby and screeds to impact the media, wherein the screed arm and the test arm are radially separated.

2. The device of claim 1 further comprising:
 a second test arm opposite the first drive arm operatively connected to the drive shaft extending radially outward from the drive shaft being driven rotationally thereby;
 a second adjustable mount at the end of the second test arm and above the media bin, having a second motorized drive screw and a second slide shaft connected thereto moving vertically up and down;
 a second wear part affixed to the bottom of the second adjustable mount and extending into the media in the media bin such that rotation of the second test arm by the motor exposes the wear part to wear; and
 a second screed arms operatively connected to the drive shaft extending radially outward from the drive shaft being driven rotationally thereby and the first and second screed arms impact the media, wherein the screed arms and the test arms are radially separated.

3. The device of claim 2 where the screed arms further comprise adjustable screed supports that extend downward to the surface of the media and smooth out the media upon rotation.

4. The device of claim 2 further comprising an arm support atop the screed and test arms for supporting thereof.

5. The device of claim 1 where the gear box has a speed reduction to provide output torque response.

6. The device of claim 1 further comprising a load sensor on the test arm for sensing strain on the test arm.

7. The device of claim 1 further comprising a center support for supporting the drive shaft and test arm.

8. The device of claim 1 where the adjustable mount further comprises a plurality of slide bearings attached to the end of the test arm, and a plurality of slide shafts extending through the slide bearings, an upper and lower plate secure to the upper and lower ends of the slide shafts, whereby the motorized drive screw threads through a bracket at the end of the test arm thereby moving the adjustable mount vertically up and down relative to the test arm.

9. The device of claim 8 where the wear part attaches to the bottom of the lower plate of the adjustable mount.

10. The device of claim 1 where the wear part can be mounted in a reverse position, and the direction of movement thereof can be reversed.

11. A wear testing device, comprising:
 a round media bin having a circular inner and outer wall for containing a test medium therebetween;
 a centrally located motor, gear box, and drive shaft and has a speed reduction to provide output torque response;
 a first and second test arms operatively connected to the drive shaft extending radially outward from the drive shaft being driven rotationally thereby, and load sensors on the arms for sensing the strain on the test arms;
 a first and second screed arms operatively connected to the drive shaft extending radially outward from the drive shaft being driven rotationally thereby, wherein the screed arms and the test arms form right angles with each other, and wherein the screed arms further comprise adjustable screed supports that extend downward to the surface of the media and smooth out the media upon rotation thereof;
 a center support for supporting the drive shaft and the test arms and screed arms;

a first and second adjustable mounts at the end of the test arms and above the media bin, having a motorized drive screw and a slide shaft connected thereto moving vertically up and down, where the adjustable mounts each include a plurality of slide bearings attached to the end of the test arms, and a plurality of slide shafts extending through the slide bearings, an upper and lower plate secured to the upper and lower ends of the slide shafts, whereby the motorized drive screws threads through brackets at the end of the test arms thereby moving the adjustable mounts vertically up and down relative to the test arm;

a first and second mounting plate connected to the adjustable mounts having an angular tilt and a plurality of holes therein a first and second wear part affixed to at least one of the mounting plate and extending into the media in the media bin such that rotation of the test arms by the motor exposes the wear part to wear; and the second screed arms operatively connected to the drive shaft extending radially outward from the drive shaft being driven rotationally thereby and the first and second screed arms impact the media, wherein the screed arms and the test arms are radially separated.

* * * * *